3,492,318
CYCLOPROPENYL ANDROSTANES
Pierre Crabbe, Mexico City, Mexico, assignor to Syntex Corporation, Panama, Panama, a corporation of Panama
No Drawing. Filed Jan. 22, 1968, Ser. No. 699,311
Int. Cl. C07c *169/22, 173/00;* A61k *17/00*
U.S. Cl. 260—397.3                                   22 Claims

ABSTRACT OF THE DISCLOSURE 17-ethynyl and 17-(1'-propynyl)-androst-4-ene and the 19-nor compounds are reacted with a dihalocarbene generating agent to afford new dihalomethylene derivatives and new cyclopropenyl derivatives useful as progestational agents.

This invention relates to novel cyclopentanophenanthrene derivatives. More particularly, the present invention relates to novel cyclopentanophenanthrene derivatives which are obtained by the reaction of a 17-ethynyl or 17-(1'-propynyl)-androstene or 19-norandrostene with a dichlorocarbene or difluorocarbene generating agent such as sodium chlorodifluoroacetate or sodium trichloroacetate.

These novel cyclopentanophenanthrene derivatives are represented by the following formulas:

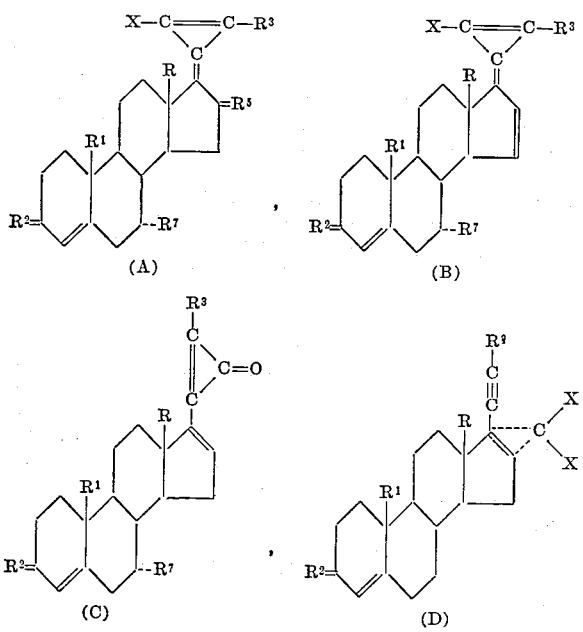

and

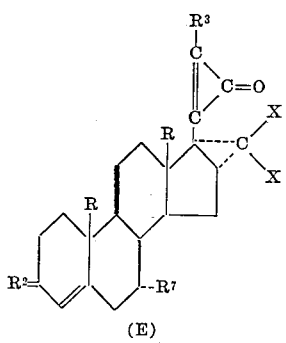

wherein, X is chloro or fluoro; R is methyl or ethyl; each of $R^1$ and $R^3$ is hydrogen or methyl; $R^2$ is oxo or the group

in which $R^4$ is hydroxy and the hydrolyzable esters thereof, tetrahydropyran-2'-yloxy or tetrahydrofuran-2'-yloxy; $R^5$ is oxo or the group

in which $R^6$ is hydrogen, hydroxy and the hydrolyzable esters thereof, chloro or fluoro; and $R^7$ is hydrogen or methyl.

As mentioned above, the novel compounds of the present invention are obtained by the reaction of a dihalocarbene generating agent with a 17-(ethynyl)- or 17-(1'-propynyl)-androst-4-ene or 19-norandrost-4-ene of the following formula:

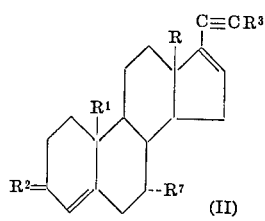

wherein, R, $R^1$, $R^2$, $R^3$ and $R^7$ are the same as defined above. In the practice of this process, a $\Delta^{16}$-17-ethynyl or $\Delta^{16}$-17-(1'-propynyl) of Forumla II is reacted with a dihalocarbene generating agent such as sodium chlorodifluoroacetate or sodium trichloroacetate in an inert solvent such as diglyme at reflux temperature for a period of time of about 15 minutes or longer. The reaction furnishes a mixture of compounds, namely, the compounds of Formulas B, C, D, and E and A (wherein $R^5$ is the group

in which $R^6$ is hydroxy, fluoro or chloro). The novel compounds of formula A wherein $R^5$ is oxo is obtained by oxidation of the corresponding 16α-hydroxy compound obtained in the foregoing reaction. This oxidation can be accomplished using, for example, chromium trioxide in pyridine at about room temperature for about 16 hours or more.

The $\Delta^{16}$-17-ethynyl and $\Delta^{16}$-17-(1'-propynyl) starting material of Formula II above can be obtained by treating a 17β-hydroxy-17α-ethynyl and 17β-hydroxy-17α-(1'-propynyl)-androst-4-ene or 19-norandrost-4-ene, respectively, with acetic acid and acetic anhydride in the presence of p-toluenesulfonic acid at about room temperature for about one to several hours. This conversion can be illustrated as follows:

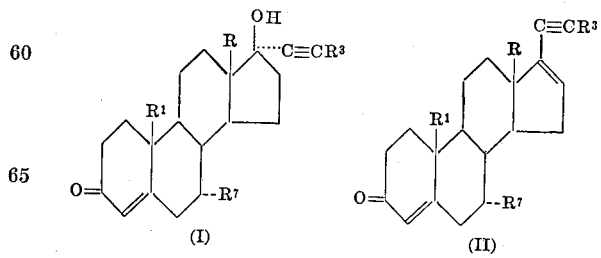

The 3-keto compounds of the present invention can be reduced with sodium borohydride or the like and the resulting 3β-hydroxy compound can then be etherified with dihydropyran or dihydrofuran in the presence of p-toluenesulfonyl chloride or p-toluenesulfonic acid or esterified with, e.g. an acid anhydride in pyridine, or the like.

The compounds of the present invention of the above Formulas A–E possess progestational activity and are useful in the regulation of fertility such as for estrus synchronization of animals. In addition, the compounds of the present invention demonstrate anti-estrogenic activity. They can be administered either orally or subcutaneously together with conventional pharmaceutical excipients at dosage rates of from about 5 µg. to about 5 mg. per kilogram of body weight per day. In the case of estrus synchronization of cattle and sheep, the compounds of the present invention can be administered by preparing a mix with the feed daily supplied so as to provide from about one to three mg. of the compound per day for about 18 to 20 days. However, dosages below or above this range can also be used, the most favorable dosage being dependent upon the purpose for which it is administered and the response thereto.

The compounds of formulas A and B above of the present invention have a double bond at C–17 giving rise to cis and trans isomers. Each of the isomers is included within the scope of this invention and can be separated from the reaction mixture via conventional techniques such as chromatography.

Suitable methods for the preparation of the compounds of Formula I are set forth in, for example, U.S. Patents 3,262,949, 3,318,925, 3,318,928, 3,341,527, 3,341,557 and 3,346,570 and Baddeley et al., Journal of Organic Chemistry, 1026–1032 (April, 1966).

The following examples are provided to illustrate the present invention.

EXAMPLE 1

A mixture of 10 g. of 17$\beta$-hydroxy-17$\alpha$-(1'-propynyl)-estr-4-en-3-one, 500 ml. of acetic acid, 100 ml. of acetic anhydride and 10 g. of p-toluenesulfonic acid is stirred at room temperature for about 1.3 hours. Water (about 2 l.) is then added and the mixture filtered. The residue collected is washed to neutrality and dried to afford 17-(1'-propynyl)-estr-4, 16-dien-3-one which can further purified by recrystallization from methanol, if desired.

By repeating the above process using 17$\beta$-hydroxy-17$\alpha$-ethynylestr-4-en-3-one, 17$\beta$-hydroxy-17$\alpha$ - (1'-propynyl)-androst-4-en-3-one, 17$\beta$-hydroxy-17$\alpha$ - (1'-propynyl)-18-methylestr-4-en-3-one, 17$\beta$-hydroxy-17$\alpha$ - (1'-propynyl)-18-methylandrost-4-en-3-one, 17$\alpha$ - (1'-propynyl) - estr-4-ene-3$\beta$,17$\beta$-diol 3-acetate and 17$\beta$-hydroxy-17 - (1'-propynyl)-7$\alpha$-methylestr-4-en-3-one as the the starting material, there is obtained 17-ethynylestra-4,16-dien-3-one, 17-(1'-propynyl)-androsta-4,16-dien-3-one, 17 - (1'-propynyl)-18-methylestra-4,16-dien-3-one, 17 - (1'-propynyl) 18-methylandrosta-4,16-dien-3-one, 17 - (1'-propynyl)-estra-4,16-dien-3$\beta$-ol 3-acetate and 17-(1'-propynyl)-7$\alpha$-methylestra-4,16-dien-3one, respectively.

EXAMPLE 2

A mixture of 6g. of 17(1'-propynyl)-estr-4,16-dien-3-one and 2 molar equivalents of sodium chlorodifluoroacetate in 240 ml. of diglyme under nitrogen is heated at reflux temperature for 15 minutes and then cooled to below 100° C. An additional 2 molar equivalents of sodium chlorodifluoroacetate is added and the resulting mixture refluxed for 15 minutes. This procedure is repeated until a total of 8 molar equivalents of sodium chlorodifluoroacetate is added. Then the reaction mixture is cooled, filtered and the filtrate evaporated in vacuo. The residue is chromatographed on Florisil (synthetic magnesium silicate) eluting with:

(1) hexane:ether (95.5) to give a first fraction containing 16$\alpha$,17$\alpha$-(difluoromethylene)-17$\beta$ - (1'-propynyl)-ester-4-en-3-one, 17(2'-fluoro-3'-methylcyclopropenyliden-yl)-estra-4,15-dien-3-one, 16$\alpha$-fluoro-17 - (2' - fluoro-3'-methylcyclopropenylidenyl)-estr-4-en-3 - one and some starting material;

(2) hexane:ether (70:30) to give a second fraction containing 17-(2'-fluoro-3' - methylcycloproponylidenyl)-16$\alpha$-hydroxyestr-4-en-3-one; and (3) ether:ethyl acetate (90:10) to give a third fraction containing 16$\alpha$,17$\alpha$-(difluoromethylene)-17$\beta$ - (3'-methyl-cyclopropenon-2'-yl)-estr-4-en-3-one and 17 - (3'-methyl-cyclopropenon-2'-yl)-estr-4,16-dien-3-one.

Fractions 1 and 3 are further separated by chromatography to obtain the individual compounds which can be further purified by recrystallization.

By repeating the process of this example using an equivalent amount of sodium trichloroacetate in place of sodium chlorodifluoroacetate, the corresponding chloro derivatives are obtained.

Using the compounds obtained by the process of Example 1 as the starting material in the process of this example furnishes the corresponding products.

EXAMPLE 3

A mixture of 270 mg. of 16$\alpha$-hydroxy-17-(2'-fluoro-3'-methylcycloropenylidene)-estr-4-en-3-one, 6.5 ml. of pyridine and 270 mg. of chromium trioxide pyridine complex is stirred for about 16 hours at room temperature. The reaction mixture is then filtered. To the filtrate is added neutral alumina and the mixture is stirred 30 minutes and then filtered. The filtrate is poured into water and the resulting mixture extracted with benzene. The benzene extract is washed to neutrality with water, dried over sodium sulfate and evaporated to dryness to afford 17-(2'-fluoro-3'-methylcyclopropenylidene)-estr - 4 - ene - 3, 16-dione.

EXAMPLE 4

One gram of 17-(2'-fluoro-3' - methylcyclopropenylidenyl)-estra-4,15-dien-3-one in 50 ml. of ethyl acetate is hydrogenated using 0.3 g. of 5% palladium-on-charcoal catalyst at room temperature until one equivalent of hydrogen is taken up. The catalyst is then removed by filtration and the filtrate evaporated to give 17-(2'-fluoro-3'-methylcyclopropenylidenyl)-estr-4-en-3-one which can be purified by chromatography or recrystallization.

By use of the above procedure, the other 4,15-diene compounds of the present invention can be converted into the corresponding 14,15-dihydro compounds.

EXAMPLE 5

A mixture of 1 g. of 17-(1'-propynyl)-estra-4,16-dien-3-one, 50 ml. of anhydrous tetrahydrofuran and 1 g. of lithium tri-t-butoxyaluminum hydride is allowed to stand at about 20° C. for about 24 hours. Thereafter, the mixture is evaporated under reduced pressure to yield 17-(1'-propynyl)-estra-4,16-dien-3$\beta$-ol which can be purified by chromatography or recrystallization from acetone: hexane.

By use of the above procedure, other 3-keto compounds herein can be converted into corresponding 3$\beta$-hydroxy compounds.

EXAMPLE 6

A mixture of 1 g. of 17-(1'-propynyl)-estra-4,16-dien-3$\beta$-ol, 4 ml. of pyridine and 2 ml. of acetic anhydride is allowed to stand at room temperature for 15 hours. The mixture is then poured into ice water and the solid which forms is collected by filtration, washed with water and dried to yield 3$\beta$-acetoxy-17 - (1'-propynyl)-estra-4,16-diene which may be further purified through recrystallization from acetone:hexane.

In a similar manner, other 3$\beta$-hydroxy compounds can be converted into the corresponding 3$\beta$-acetoxy derivatives. Alternatively, through the use of other anhydrides in the foregoing procedure or other esterification agents, e.g. acyl halides, the corresponding 3$\beta$-acylates are prepared.

By subjecting the above compounds of the procedure of Example 2, e.g. 3$\beta$-acetoxy-17-(1'-propynyl)-estra-4, 16-dione, the corresponding products are obtained, that is, 3β - acetoxy - 16α,17α - (difluoromethylene) - 17β-(1'-propynyl) - estr - 4 - ene, 3β - acetoxy - 17 - (2' - fluoro-3' - methylcyclopropenylidenyl) - estra - 4,15 - diene, 16α-fluoro - 17 - (2' - fluoro - 3' - methylcyclopropenylidenyl)- estr - 4 - ene, 3β - acetoxy - 17 - (2' - fluoro - 3' - methylcyclopropenylidenyl) - estr - 4 - en - 16α - ol, 3β - acetoxy-16α,17α - (difluoromethylene) - 17β - (3' - methylcyclopropenon - 2' - yl) - estr - 4 - ene, and 3β - acetoxy - 17- (3' - methylcyclopropenon - 2' - yl) - estra - 4,16 - diene.

The above 3β-acetates can be converted into the corresponding free 3β-hydroxy compounds by the following procedure.

One gram of 3β-acetoxy-16α,17α-(difluoromethylene)-17β-(1'-propynyl)-estr-4-ene is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 16α,17α-(difluoromethylene)-17β-(1'-propynyl)-estr-4-en-3β-ol which is collected by filtration and recrystallized from acetone:hexane.

EXAMPLE 7

A solution of 1 g. of sodium borohydride in 3 ml. of water is added to an ice-cooled solution of 1 g. of 17-(1'-propynyl)-estra-4,16-dien-3-one in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 17-(1'-propynyl)-estra-4,16-dien-3β-ol which may be further purified by recrystallization from acetone: hexane.

EXAMPLE 8

Two milliliters of dihydropyran are added to a solution of 1 g. of 17-(1'-propynyl)-estra-4,16-dien-3β-ol in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β-(tetrahydropyran-2'-yloxy)-17-(1' - propynyl)estra-4,16-diene.

Use of this process with the other free hydroxy containing compounds herein will similarly yield the corresponding tetrahydropyranyloxy derivatives.

Similarly, by repeating the above process with the exception of using dihydrofuran in place of dihydropyran, the corresponding tetrahydrofuran-2'-yloxy derivatives are obtained.

The term "conventional hydrolyzable ester," as used herein, denotes those hydrolyzable ester groups conventionally employed in the steroid art, preferably, those derived from hydrocarbon carboxylic acids or phosphoric acids and their salts. The term "hydrocarbon carboxylic acid," defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included with the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperdinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

What is claimed is:

1. A compound selected from those of the formulas:

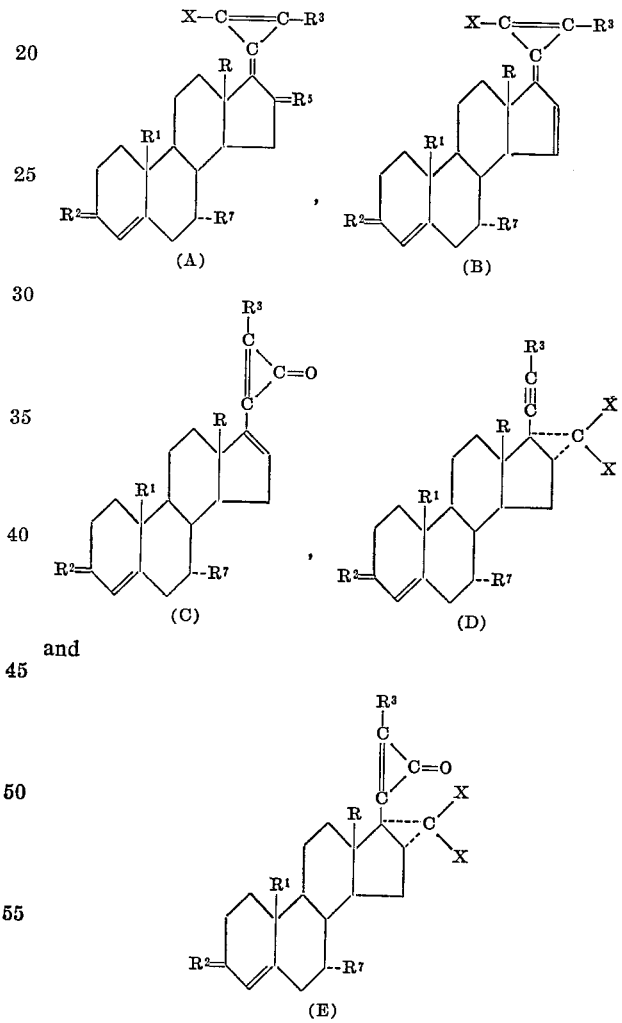

wherein, X is chloro or fluoro; R is methyl or ethyl; each of $R^1$, $R^3$ and $R^7$ is hydrogen or methyl; $R^2$ is oxo or the group

in which $R^4$ is hydroxy and the hydrolyzable esters thereof, tetrahydropyran-2'-yloxy or tetrahydrofuran-2'-yloxy; and $R^5$ is oxo or the group

in which $R^6$ is hydrogen, hydroxy and the hydrolyzable esters thereof, chloro or fluoro.

2. A compound according to Formula A of claim 1 wherein X is fluoro, $R^2$ is oxo and $R^3$ is methyl.

3. A compound according to Formula A of claim 1 wherein X is fluoro, $R^2$ is oxo, $R^3$ is methyl and $R^5$ is the group

in which $R^6$ is hydrogen, hydroxy and the hydrolyzable esters thereof or fluoro.

4. A compound according to claim 3 wherein R is methyl, $R^6$ is hydrogen and $R^7$ is hydrogen.

5. A compound according to claim 3 wherein R is methyl, $R^6$ is fluoro and $R^7$ is hydrogen.

6. A compound according to claim 3 wherein R is methyl, $R^6$ is hydroxy and $R^7$ is hydrogen.

7. A compound according to claim 3 wherein R is methyl and $R^7$ is methyl.

8. A compound according to Formula A of claim 1 wherein X is fluoro, R is methyl, $R^2$ is oxo, $R^3$ is methyl and $R^5$ is oxo.

9. A compound according to Formula B of claim 1 wherein X is fluoro, R is methyl, $R^2$ is oxo and $R^3$ is methyl.

10. A compound according to claim 9 wherein $R^7$ is hydrogen.

11. A compound according to Formula C of claim 1 wherein each of R and $R^3$ is methyl and $R^2$ is oxo.

12. A compound according to claim 11 wherein $R^7$ is hydrogen.

13. A compound according to Formula D of claim 1 wherein X is fluoro, each of R and $R^3$ is methyl and $R^2$ is oxo.

14. A compound according to claim 13 wherein $R^7$ is hydrogen.

15. A compound according to Formula E of claim 1 wherein X is fluoro, each of R and $R^3$ is methyl and $R^2$ is oxo.

16. A compound according to claim 15 wherein $R^7$ is hydrogen.

17. A compound selected from those of the formula:

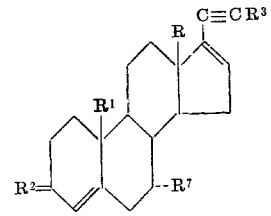

wherein, R is methyl or ethyl; each of $R^1$, $R^3$ and $R^7$ is hydrogen or methyl; and $R^2$ is oxo or the group

in which $R^4$ is hydroxy and the hydrolyzable esters thereof, tetrahydropyran-2′-yloxy or tetrahydrofuran-2′-yloxy.

18. A compound according to claim 17 wherein $R^2$ is oxo.

19. A compound according to claim 17 wherein each of R and $R^3$ is methyl and $R^2$ is oxo.

20. A compound according to claim 17 wherein $R^3$ is methyl.

21. A compound according to claim 17 wherein $R^3$ is hydrogen.

22. A compound according to claim 19 wherein $R^7$ is hydrogen.

References Cited

UNITED STATES PATENTS 3,435,056  3/1969  Edwards et al.

HENRY A. FRENCH, Primary Examiner

U.S. Cl. X.R.

260—239.5, 239.55, 397.4, 397.5, 999